(12) United States Patent
Miyazaki

(10) Patent No.: US 9,999,998 B2
(45) Date of Patent: Jun. 19, 2018

(54) GLASS-RESIN LAMINATE AND METHOD FOR PRODUCING SAME

(71) Applicant: Asahi Glass Company, Limited, Chiyoda-ku (JP)

(72) Inventor: Syo Miyazaki, Chiyoda-ku (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 0 days. days.

(21) Appl. No.: 15/139,599

(22) Filed: Apr. 27, 2016

(65) Prior Publication Data

US 2016/0236383 A1     Aug. 18, 2016

Related U.S. Application Data

(63) Continuation of application No. PCT/JP2014/082586, filed on Dec. 9, 2014.

(30) Foreign Application Priority Data

Dec. 16, 2013   (JP) .................................. 2013-259588

(51) Int. Cl.
*B29C 45/14*     (2006.01)
*B32B 17/10*     (2006.01)
(Continued)

(52) U.S. Cl.
CPC .. *B29C 45/14508* (2013.01); *B29C 45/14467* (2013.01); *B32B 17/10018* (2013.01);
(Continued)

(58) Field of Classification Search
CPC ................ B32B 2369/00; B32B 17/10; B32B 17/10018; B32B 17/10036;
(Continued)

(56) References Cited

U.S. PATENT DOCUMENTS 6,368,537 B1      4/2002  Sato et al.
2003/0118840 A1*  6/2003  Moran .................... B32B 17/10
                                                   428/425.6
(Continued)

FOREIGN PATENT DOCUMENTS

CN    85 1 02735 A    10/1986
JP    60-250927       12/1985
(Continued)

OTHER PUBLICATIONS

English Translation of International Search Report dated Mar. 17, 2015 in PCT/JP2014/082586, filed Dec. 9, 2014.

*Primary Examiner* — Jennifer Chriss
*Assistant Examiner* — Lawrence Ferguson
(74) *Attorney, Agent, or Firm* — Oblon, McClelland, Maier & Neustadt, L.L.P.

(57) ABSTRACT

A glass/resin laminate (A) including glass plates laminated on both sides of a polycarbonate layer through bonding layers made of a thermoplastic resin, each of the glass plates having a thickness of from 0.3 to 1 mm and having compressive stresses of at least 3 MPa on an entire surface thereof is provided. The glass/resin laminate (A) is obtainable by a process including a step (1) for disposing a bonding layer on one side of a polycarbonate film having a certain thickness, the bonding layer being made of a thermoplastic resin; a step (2) for stacking a glass plate on the bonding layer to prepare a laminate (B) with the polycarbonate film and the glass plate being laminated through the bonding layer; and a step (3) for preparing another similar laminate (B), placing both laminates (B) in a mold such that both polycarbonate films are confronted each other, and forming a polycarbonate layer between the confronted polycarbonate films.

13 Claims, 2 Drawing Sheets

(51) Int. Cl.
    *B29C 45/56*     (2006.01)
    *B29K 75/00*     (2006.01)
    *B29K 669/00*     (2006.01)
    *B29K 709/08*     (2006.01)
    *B29L 31/30*     (2006.01)

(52) U.S. Cl.
    CPC .... *B32B 17/10036* (2013.01); *B32B 17/1077* (2013.01); *B32B 17/10752* (2013.01); *B32B 17/10761* (2013.01); *B32B 17/10788* (2013.01); *B29C 45/561* (2013.01); *B29C 2045/14532* (2013.01); *B29K 2075/00* (2013.01); *B29K 2669/00* (2013.01); *B29K 2709/08* (2013.01); *B29L 2031/3052* (2013.01); *B32B 2250/40* (2013.01); *B32B 2369/00* (2013.01); *B32B 2419/00* (2013.01)

(58) Field of Classification Search
    CPC ........ B32B 17/10752; B32B 17/10761; B32B 17/1077; B32B 17/10788; B32B 2250/40; B32B 2419/00; B29C 2045/14532; B29C 45/14467; B29C 45/14508
    See application file for complete search history.

(56) References Cited

U.S. PATENT DOCUMENTS

2008/0176043 A1\* 7/2008 Masaki ............. B32B 17/10036
                                                                                                 428/172
2012/0128952 A1     5/2012   Miwa et al.

FOREIGN PATENT DOCUMENTS

| JP | 3-251448 | 11/1991 |
|---|---|---|
| JP | 9-286039 | 11/1997 |
| WO | WO96/12604 A1 | 5/1996 |
| WO | WO01/38088 A1 | 5/2001 |
| WO | WO2012/157617 A1 | 11/2012 |

\* cited by examiner

GLASS-RESIN LAMINATE AND METHOD FOR PRODUCING SAME

TECHNICAL FIELD

The present invention relates to a glass/resin laminate with glass and a resin laminated therein, and a process for producing the same.

BACKGROUND ART

As window glass for a vehicle, such as an automobile, and window glass for a building material to be mounted to a building, such as a house and an office building, it has been recently investigated to use a glass/resin laminate with glass plates and a resin layer laminated therein in place of conventional glass plates. It is possible to laminate a resin layer on glass plates to reduce the weight of window glass because the resin has a smaller specific gravity than glass. A lightweight glass/resin laminate is expected to be applied to, in particular, window glass for a vehicle, such as an automobile. By using a resin made of, e.g. polycarbonate having low penetration, it is also possible to provide a glass/resin laminate with antitheft performance.

With regard to such a glass/resin laminate, e.g. Patent Document 1 discloses that two glass plates, each of which has a single side formed with an interlayer made of a resin material, are prepared, the glass plates are placed in the cavity of an injection molding machine so as to have both interlayers confronted to each other, and a molten resin is injected into between both interlayers to produce a glass/resin laminate with a resin layer interposed between the glass plates.

PRIOR ART DOCUMENT(S)

Patent Document(s)

Patent Document 1: JP-H09-286039

DISCLOSURE OF INVENTION

Technical Problem

The inventor, however, has found that the glass/resin laminate disclosed in Patent Document 1 is difficult to be produced on a commercial basis because a resin, which has formed the interlayers, flows in a streak-like flow during injection molding to produce a resin flow formation such that the glass/resin laminate is provided with an extremely poor appearance.

Further, the glass/resin laminate is required to have not only a good appearance but also an impact resistance such that the laminate is hardly to be cracked even if a flying object, such as a stone, is hit against the laminate. From this point of view, it is desirable to develop a glass/resin laminate having an excellent impact resistance and an excellent appearance.

It is an object of the present invention to provide a glass/resin laminate which is excellent in impact resistance and appearance, and a process for producing the same.

Solution to Problem

The present invention provides solutions as defined in the following items:

[1] A process for producing a glass/resin laminate (A) including:
a step (1) for disposing a bonding layer on one side of a polycarbonate film having a thickness of from 0.05 to 0.2 mm, the bonding layer being made of a thermoplastic resin;
a step (2) for stacking a glass plate on the bonding layer to prepare a laminate (B) with the polycarbonate film and the glass plate being laminated through the bonding layer; and
a step (3) for preparing another similar laminate (B), placing both laminates (B) in a mold such that both polycarbonate films are confronted each other, and forming a polycarbonate layer between the confronted polycarbonate films.

[2] A process for producing a glass/resin laminate (A) including:
a step (1') for disposing a bonding layer on one side of a glass plate, the bonding layer being made of a thermoplastic resin;
a step (2') for stacking a polycarbonate film having a thickness of from 0.05 to 0.2 mm on the bonding layer to prepare a laminate (B) with the glass plate and the polycarbonate film being laminated through the bonding layer; and
a step (3) for preparing another similar laminate (B), placing both laminates (B) in a mold such that both polycarbonate films are confronted each other, and forming a polycarbonate layer between the confronted polycarbonate films.

[3] The process for producing a glass/resin laminate (A) according to item 1 or 2, wherein the thermoplastic resin has a glass transition temperature of from 160 to 250° C.

[4] The process for producing a glass/resin laminate (A) according to any one of items 1 to 3, wherein the thermoplastic resin is at least one kind selected from the group consisting of a thermoplastic polyurethane elastomer, an ethylene-vinyl acetate copolymer resin and polyvinyl butyral.

[5] A glass/resin laminate (A) including glass plates laminated on both sides of a polycarbonate layer through bonding layers made of a thermoplastic resin, each of the glass plates having a thickness of from 0.3 to 1 mm and having compressive stresses of at least 3 MPa on an entire surface thereof.

[6] The glass/resin laminate (A) according to item [5], wherein the polycarbonate layer includes the polycarbonate films and an injection-molded polycarbonate layer.

[7] The glass/resin laminate (A) according to item [5] or [6], wherein the polycarbonate layer has a thickness of from 2 to 6 mm.

[8] The glass/resin laminate (A) according to any one of items [5] to [7], wherein the thermoplastic resin has a glass transition temperature of from 160 to 250° C.

[9] The glass/resin laminate (A) according to any one of items [5] to [8], wherein the thermoplastic resin is at least one kind selected from the group consisting of a thermoplastic polyurethane elastomer, an ethylene-vinyl acetate copolymer resin and polyvinyl butyral.

[10] A laminate (B) including a polycarbonate film laminated on one side of a glass plate through a bonding layer, the polycarbonate film having a thickness of from 0.05 to 0.2 mm, the glass plate having a thickness of from 0.3 to 1 mm, and the bonding layer being made of a thermoplastic resin.

[11] The laminate (B) according to item [10], wherein the thermoplastic resin is at least one kind selected from the group consisting of a thermoplastic polyurethane elastomer, an ethylene-vinyl acetate copolymer resin and polyvinyl butyral.

Advantageous Effects of Invention

The present invention provides a glass/resin laminate (A) which is excellent in impact resistance and appearance, a process for producing the same, and a laminate (B) used for the production of the glass/resin laminate (A).

BRIEF DESCRIPTION OF DRAWINGS

FIGS. 2A and B are cross-sectional views explaining a process for producing the glass/resin laminate (A) shown in FIG. 1, wherein FIG. 1A is a view explaining a step (1) while

FIGS. 3A and B are cross-sectional views explaining a process for producing the glass/resin laminate (A) shown in FIG. 1, wherein FIG. 3A is a view explaining a state where laminates (B) are placed in a cavity in a step (3) while

DESCRIPTION OF EMBODIMENTS

[Glass/Resin Laminate (A)]

Figure 1:
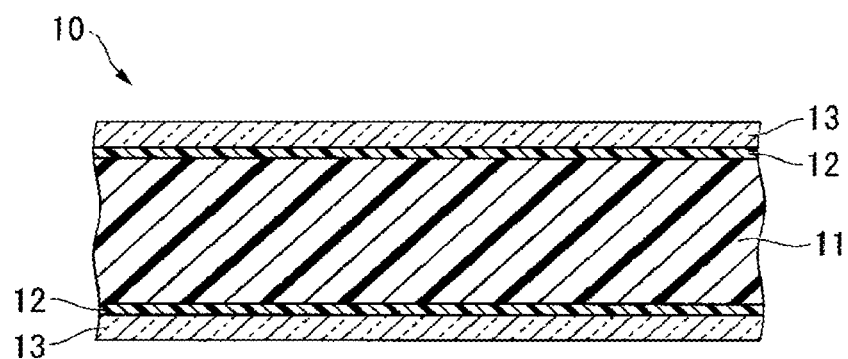
FIG. 1 is a vertical cross-sectional view showing the glass/resin laminate (A) according to an embodiment of the present invention.

FIG. 1 is a cross-sectional view showing the layer configuration of the glass/resin laminate (A) according to an embodiment of the present invention. The glass/resin laminate (A) 10 according to this embodiment is a laminate which includes a polycarbonate layer 11 having glass plates 13 bonded to both sides thereof through bonding layers 12 made of a thermoplastic resin, and which is configured such that one of the glass plates 13, one of the bonding layers 12, the polycarbonate layer 11, the other bonding layer 12 and the other glass plate 13 are laminated in this order. Each of the glass plates 13 included in the glass/resin laminate (A) 10 has a thickness of from 0.3 to 1 mm and has a compressive stress of at least 3 MPa of an entire surface thereof.

In Description, the polycarbonate is called "PC" for short in some cases while the polycarbonate layer is simply called "PC layer" for short in some cases.

The "compressive stresses" of each glass plate does not mean the compressive stresses of each glass plate prior to the production of the glass/resin laminate (A) but the compressive stresses of each glass plate in the glass/resin laminate (A) after production. In Description, the phrase that each of the glass plates has compressive stresses of at least 3 MPa on an entire surface thereof is defined as meaning that all measured values are at least 3 MPa when a glass/resin laminate (A) having dimensions of 300 mm×300 mm is used as a sample specimen, and when compressive stresses in two directions parallel to sides of each glass plate are measured at nine points on each side of each glass plate (totally eighteen points on both sides) in the sample specimen. The measuring points at the nine points are respective centers of the sections that are obtained by dividing the glass/resin laminate (A) into nine parts having 100 mm×100 mm.

The compressive stresses may be measured by use of "Glass Surface Stress Meter FSM-7000" manufactured by Orihara industrial Co., Ltd.

Each glass plate 13 has a thickness of from 0.3 to 1 mm as described above, preferably from 0.4 to 0.7 mm. When each glass plate 13 has a smaller thickness than the lower limit of the above-mentioned former range, the glass/resin laminate (A) 10 becomes insufficient in impact resistance such that the laminate tends to be likely to be cracked when a flying object, such as a stone, is hit against a glass plate 13. When each glass plate 13 has a greater thickness than the upper limit of the above-mentioned former range, the glass/resin laminate (A) 10 becomes insufficient in weight reduction. Further, it is difficult, in some cases, to apply compressive stresses of at least 3 MPa to the entire surface of each glass plate 13, which will be described in details.

The thickness of each glass plate 13 may be measured by, e.g. a micrometer or a laser displacement gauge.

The compressive stresses on the entire surface of each glass plate 13 in the glass/resin laminate (A) 10 is at least 3 MPa as described above, preferably at least 5 MPa. Although there is no limitation to the upper limit of the compressive stresses, the upper limit is normally about 50 MPa. When the compressive stresses are lower than the above-mentioned former lower limit, the glass/resin laminate (A) 10 becomes insufficient in impact resistance such that the laminate is likely to be cracked if a flying object, such as a stone, is hit against a glass plate 13.

There is no particular limitations to the material/composition of each glass plate 13. Soda lime glass, alkali-borosilicate glass, alkali-free-borosilicate glass or alkali-free-aluminosilicate glass may be mentioned for example.

Each bonding layer 12 is a thermoplastic resin layer which is disposed for the purpose of bonding the PC layer 11 and the glass plates 13. The thermoplastic resin forming each bonding layer 12 has a glass transition temperature of preferably from 160 to 250° C. It should be noted that the glass transition temperature referred to with respect to the present invention means an extrapolated starting temperature of glass transition measured by differential scanning calorimetry (DSC). When the thermoplastic resin forming each bonding layer 12 has a lower glass transition temperature not higher than the upper limit of the above-mentioned range, each bonding layer 12 is adequately molten between the PC layer 11 and the glass plates 13 to exhibit good adhesion performance when molten PC is injected in a step (3) during production of the glass/resin laminate (A), which will be described in details. When the thermoplastic resin forming each bonding layer 12 is a glass transition temperature of not lower than the lower limit of the above-mentioned range, each bonding layer 12 is stably held between the PC layer 11 and the glass plates 13 to exhibit good adhesion performance without being subjected to a resin flow due to the heat and pressure of the injected PC in the step (3) during production of the glass/resin laminate (A). Placing more emphases on the transparency of each bonding layer 12, the thermoplastic resin forming each bonding layer 12 has a glass transition temperature of preferably from 180 to 200° C.

The thermoplastic resin forming each bonding layer 12 is preferably a resin other than PC, which has adhesiveness capable of bonding the PC layer 11 and the glass plates 13, and which is specifically at least one kind selected from the group consisting of a thermoplastic polyurethane elastomer, an ethylene-vinyl acetate copolymer resin and polyvinyl butyral for example. Among them, a thermoplastic polyurethane elastomer is preferred from the viewpoint of being excellent in adhesive performance of bonding the PC layer 11 and the glass plates 13.

Each bonding layer 12 has a thickness of preferably from 0.01 to 0.1 mm, more preferably from 0.03 to 0.07 mm. When each bonding layer 12 has a thickness of not lower than the lower limit of the above-mentioned former range, each bonding layer 12 exhibits sufficient adhesiveness. When each bonding layer 12 has a thickness of not higher than the upper limit of the above-mentioned former range, the total thickness of the glass/resin laminate (A) 10 can be reduced. When each bonding layer 12 has a thickness of not higher than the upper limit of the above-mentioned former range, the heat of injected PC can be rapidly dissipated to the mold of an injection molding machine to control the influence of heat given to each bonding layer 12 in the step (3) during production of the glass/resin laminate (A).

As PC forming the PC layer 11, aromatic PC, such as bisphenol A-based PC, is preferred in terms of rupture resistance, transparency and another factor.

The PC layer 11 has a thickness of preferably from 2 to 6 mm, more preferably from 3 to 5 mm. When the PC layer 11 has a thickness of not lower than the lower limit of the above-mentioned former range, the glass/resin laminate (A) 10 has an excellent impact resistance. When the thickness is not higher than the upper limit of the above-mentioned former range, the total thickness of the glass/resin laminate (A) 10 can be reduced.

[Process for Producing Glass/Resin Laminate (A)]

The glass/resin laminate (A) shown in FIG. 1 may be produced by the steps (1) to (3) shown in FIGS. 2A and 2B and FIGS. 3A and 3B.

(Step (1))

Figure 2A:
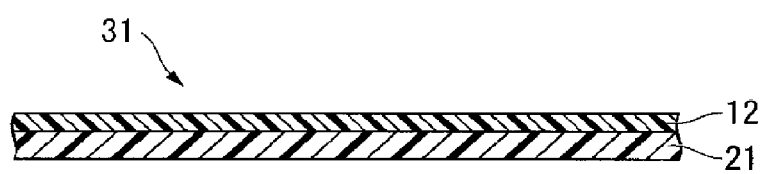

The step (1) is a step where, as shown in FIG. 2A, a bonding layer 12 made of a thermoplastic resin is disposed on one side of a polycarbonate film (hereinbelow, also referred simply to PC film) 21 having a thickness of from 0.05 to 0.2 mm to prepare a resin laminate 31 including the PC film 21 and the bonding layer 12. The PC film 21 works as a shock-absorbing material for alleviating the heat and pressure applied to the bonding layers 12 from the PC when molten PC is injected in the step (3) described later. The PC film 21 is integrated with the injection-molded PC (which is also called a polycarbonate layer formed by injection molding of PC) to form the PC layer 11.

As the PC film 21, an extruded film made of aromatic PC, such as bisphenol A-based PC, or a similar film may be mentioned.

The PC film 21 has a thickness of from 0.05 to 0.2 mm as described above, preferably from 0.07 to 0.15 mm. When the PC film 21 has a thickness of not smaller than the lower limit of the above-mentioned former range, the PC film 21 sufficiently works as a shock-absorbing material for alleviating the heat and the pressure applied to the bonding layer 12 from the injected PC in the step (3) described later. When the PC film 21 has a thickness of not higher than the upper limit of the above-mentioned former range, the PC film 21 is favorably integrated with the injected PC in the step (3). When the PC film 21 has a thickness of not greater than the upper limit of the above-mentioned former range, the heat of the injected PC can be rapidly dissipated to the mold of the injection molding machine to reduce the influence of heat given to the bonding layer 12 in the step (3) in the production of the glass/resin laminate (A).

As the method for forming the bonding layer 12, an application method where a molten thermoplastic resin or a solution with a thermoplastic resin dissolved in a solvent is applied to one side of the PC film 21, an extrusion method where a molten thermoplastic resin is extruded to form a film on one side of the PC film 21, a method for producing a film made of a thermoplastic resin and attaching the film to one side of the PC film 21, or the like may be mentioned. When the thermoplastic resin is a thermoplastic polyurethane elastomer for example, the application method is preferred from the viewpoint that the bonding layer 12 can be formed in a simple manner.

The formed bonding layer 12 has a thickness of preferably from 0.01 to 0.1 mm as described above, more preferably from 0.03 to 0.07 mm. In this embodiment, even when the thickness of the bonding layer 12 is thin as defined by the above-mentioned ranges, the bonding layer exhibits sufficient adhesiveness since the PC film 21 is interposed as a shock-absorbing material between the injected PC and the bonding layer 12.

As a modification of the above-mentioned step (1), a step (1') where a bonding layer made of a thermoplastic resin is disposed on one side of the glass plate may be mentioned.

(Step (2))

Figure 2B:
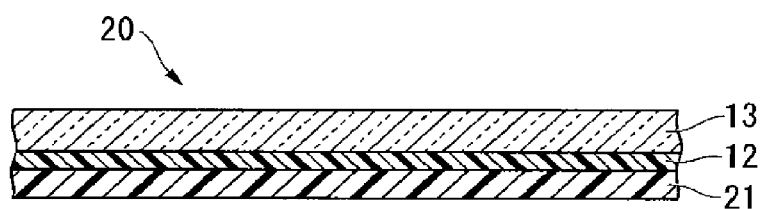
FIG. 2B is a view explaining a step (2).

The step (2) is a step where, as shown in FIG. 2B, a glass plate 13 is stacked on the bonding layer 12 of the resin laminate 31 obtained in the step (1) to prepare a laminate (B) 20 with the PC film 21 and the glass plate 13 being laminated through the bonding layer 12. In the laminate (B) 20, the PC film 21 and the glass plate 13 are in a state where both have adhered to each other and been stuck to each other by the adhesiveness of the bonding layer 12. The stucking may be carried out under ordinary temperature by use of a roller laminator or the like. The laminate (B) is a precursor laminate which is suited to the production of the glass laminate (A) according to the present invention.

The glass plate 13 has a thickness of preferably from 0.3 to 1 mm as described above, more preferably from 0.4 to 0.7 mm.

As a modification of the above-mentioned (step (2)), a step (2') wherein a PC film having a thickness of from 0.05 to 0.2 mm is stacked on the bonding layer made of a thermoplastic resin and disposed on the one side of the glass plate prepared by the step (1') such that the laminate (B) is prepared so as to have the glass plate and the polycarbonate film laminated therein through the bonding layer, may be mentioned. Even in this modification, it is also possible to prepare the laminate (B) 20, wherein the PC film 21 is stacked on the laminate including the glass plate 13 and the bonding layer 12, and the PC film 21 and the glass plate 13 are laminated through the bonding Layla 12.

(Step (3))

The step (3) is a step wherein another similar laminate (B) 20, which is produced in the same step as the step (2), is prepared, both laminates (B) 20 are placed in a mold such that both the PC films 21 are confronted each other, and a PC layer is formed between the confronted PC films 21. It is preferred that the two laminates "B" 20 be placed in the cavity of the mold in an injection molding machine such that the PC films 21 are confronted each other, and that PC be injected into between the confronted PC films 21 to form the PC layer. The step (3) is preferably carried out by use of, e.g. an injection molding machine 30 shown in FIGS. 3A and 3B.

The shown injection molding machine 30 is substantially configured to include a molding unit 32, an unshown injection unit for injecting a molten PC resin in the molding unit 32 and an unshown control unit for controlling the molding unit 32 and the injection unit.

The molding unit 32 includes a fixed die 33 and a movable die 34 disposed so as to be movable with respect to the fixed die 33 such that a cavity 31 is formed between the fixed die 33 and the movable die 34. The fixed die 33 has a gate 33b formed therein so as to supply molten PC into the cavity 31 from the injection unit. The fixed die 33 and the movable die 34 have cavity forming surfaces 33a and 34a formed thereon so as to form the cavity 31, respectively, and the respective cavity forming surfaces are formed with unshown suction-holding mechanisms to suck and hold the laminates (B) 20. Specifically, the cavity forming surfaces 33a and the cavity forming surfaces 34a have unshown minute suction apertures formed therein to suck and hold the laminates (B) 20, respectively, by sucking out air in the cavity through the sucking apertures.

Figure 3A:
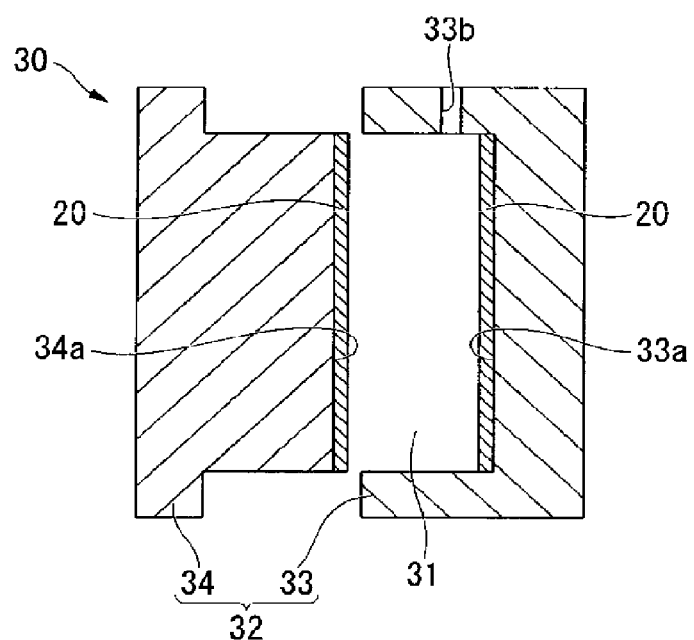

In the step (3), the fixed die 33 and the movable die 34 are first set in an open state, and the two laminates (B) 20 are placed in the cavity 31 as shown in FIG. 3A. Specifically, the above-mentioned suction-holding mechanism are utilized to suck and hold one of the laminates (B) 20 onto the cavity forming surfaces 33a of the fixed die 33 and suck and hold the other laminate (B) 20 onto the cavity forming surfaces 34a of the movable die 34. During this operation, the two laminates (B) 20 are placed such that the PC films are confronted each other and that the respective glass plates are brought into contact with the respective cavity forming surfaces 33a and 34a.

The control unit is utilized to perform such temperature control that the temperatures of the fixed die 33 and the movable die 34 (mold temperature) are set at a temperature of from 80 to 110° C.

Figure 3B:
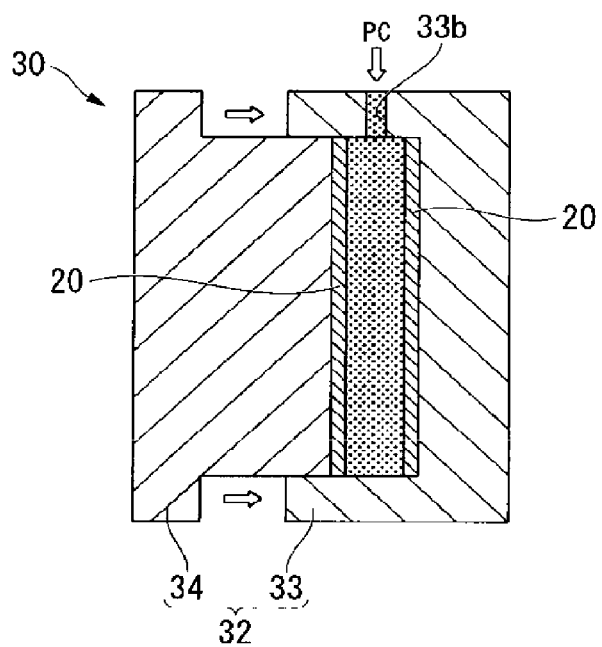
FIG. 3B is a view explaining a state where polycarbonate is injected in the step (3).

Subsequently, the movable die 34 is moved by a certain distance so as to be brought closer to the fixed die 33 and is set in a clamped state, followed by activating the injection unit such that molten PC having a temperature of from 280 to 320° C. is injected into between the PC films in the cavity 31 through the gate 33b as shown in FIG. 3B.

After that, the clamped state is kept until the molten PC is cooled and solidified.

It should be noted that the step (3) may be carried out by adopting injection compression molding wherein the cavity 31 is set so as to be slightly opened during injection of the PC, and that the movable die 34 is further moved toward the fixed die 33 to apply pressure and compression after completion of injection. According to the injection compression molding which applies compression after injection as described above, it is possible to mold the PC layer 11 with distortion due to molecular orientation being controlled.

In the above-mentioned step (3), the laminates (B) prepared by the step (1') and the step (2') may be used.

The glass/resin laminate (A) 10 shown in FIG. 1 is obtained by the above-mentioned steps (1), (2) and (3) or steps (1'), (2') and (3). In the glass/resin laminate (A) 10, the PC films of the laminates (B) are integrated with the injected PC to form the PC layer 11. In other words, the PC layer 11, which is formed in the steps as exemplified above, is made of the polycarbonate films and the injection-molded polycarbonate layer.

This production process adopts a process where molten PC having a high temperature is injected into between the two laminates (B) 20 having the glass plates 13, respectively. The glass plates 13, the bonding layer 12 and the PC layer 11 are cooled from a high temperature to a low temperature after injection. Although the glass plates 13, the bonding layer 12 and the PC layer 11 are all shrunk in the course of cooling, the glass and resin have different shrinkage factors in that course such that the resin has a greater shrinkage factor. For this reason, the glass plates 13 are cooled, being brought, in the cavity 31, into contact with the resin having a greater shrinkage factor, such that each glass plate 13 has compressive stresses of at least 3 MPa on an entire surface thereof. The application of the compressive stresses improves the impact resistance of the glass/resin laminate (A) 10 such that the laminate is hardly to be cracked even if a flying object, such as a stone, is hit against a glass plate 13. Further, the above-mentioned process can apply compressive stresses to the glass plates 13 more effectively because thin glass plates are used as the glass plates 13.

In this production process, in order to produce the glass/resin laminate (A) 10, not only the glass plates 13 and the bonding layers 12 but also the two laminates (B) 20 with the PC film 21 further laminated therein are produced in advance, the laminates (B) are placed in the cavity 31, and PC is injected into between the PC films 21. For this reason, in the step (3) for injecting PC, the PC films 21 are interposed between the injected PC and the adhesive layers to work as a shock-absorbing material which alleviates the heat and pressure applied to the bonding layers by the injected PC. As a result, the bonding layers 12 are not subjected to a resin flow caused by heat and pressure such that the bonding layers can maintain a homogenous laminar structure. Thus, the glass/resin laminate (A) 10 obtained by this production process is excellent in appearance since no resin flow is noticeable on the bonding layers 12. Further, the glass/resin laminate (A) is also excellent in adhesive performance between the glass plates 13 and the PC layer 11 since the bonding layers 12 maintain a homogenous laminar structure without being subjected to a resin flow.

As described above, the above-mentioned production process allows the glass/resin laminate (A) to be provided with an impact resistance such that the laminate is hardly to be cracked even if a flying object, such as a stone, is hit against the laminate, and with an excellent appearance free from a resin flow.

The glass/resin laminate (A) is suited to window glass for a vehicle, such as an automobile, and window glass for a building material mounted to a building, such as a housing and an office building. The glass/resin laminate (A) is suitably applicable to window glass for a vehicle, such as an automobile, from the viewpoint of being lightweight.

The laminates (B) are appropriate as precursors for producing the glass/resin laminate (A).

EXAMPLES

Now, the present invention will be described in further detail with reference to Examples.

A molten thermoplastic polyurethane elastomer (manufactured by Sheedom Co., Ltd. Product Name "DUX2098", thermoplastic resin for bonding layer formation) having a high temperature was applied to one side of a PC film (manufactured by Mitsubishi Gas Chemical, Product Name "lupilon") having dimensions of 300 mm×300 mm and a thickness of 0.1 mm so as to have a thickness of 0.05 mm, and was cooled to an ordinary temperature to obtain a resin laminate with the PC film and a bonding layer made of the thermoplastic polyurethane elastomer laminated therein. The glass transition temperature (i.e. meaning the extrapolated starting temperature of glass transition measured by a differential scanning calorimetry (DSC)) of the thermoplastic polyurethane elastomer was 180° C.

A glass plate, which had dimensions of 300 mm×300 mm and a thickness of 0.5 mm and was made of soda lime glass, was stacked on the bonding layer of the resin laminate, and both were stuck together by use of a roller laminator to obtain a laminate (B-1) with the glass plate, the bonding layer and the PC film laminated in this order therein.

Subsequently, another laminate (B-1) was prepared in the same manner as the above-mentioned laminate (B-1), and the two laminates (B-1) were placed in the cavity of an injection molding machine so as to have both PC films confronted each other. Then aromatic PC (manufactured by Bayer AG, Product Name "AG2677™") was injected into between both confronted PC films, followed by carrying out injection compression molding for compression. It should be noted that each laminate (B-1) was held at a certain position in the cavity by a suction-holding mechanism. At that time, the mold was set at a temperature of 90° C., and the injected PC was set at a temperature of 300° C.

After injection compression molding (cooling), the mold was opened, and an integrally molded glass/resin laminate (A-1) was taken out of the mold. The PC layer, which was made of the PC films and the injected PC, had a thickness of 3.9 mm.

With regard to the glass/resin laminate (A-1) thus obtained, the measurement of compressive stresses on the surface, and the evaluations of the impact resistance and the appearance on the surface were carried out by the following methods. The results are shown in Table 1.

(1) Compressive Stresses

At nine points on each glass plate on both sides of the glass/resin laminate (A-1) (totally eighteen points on both sides), compressive stresses in two directions parallel to sides of each glass plate were measured. It should be noted that the measuring points at the nine points were respective centers of sections that were obtained by dividing the glass/resin laminate (A) into nine parts having 100 mm×100 mm. The measurement was carried out by use of a "Glass Surface Stress Meter FSM-7000" manufactured by Orihara industrial Co., Ltd.

And, the average value of all of the measured values (average compressive stress) and the minimum value among all of the measured values were found. It should be noted that a tensile stress was measured as a negative value.

(2) Impact Resistance

A small piece made of tungsten carbide was hit against the surface of one of the glass plates of the glass/resin laminate (A-1) several times at different speeds in order to check the presence and absence of glass cracking. Specifically, while the impact speeds were stepwise changed from a low speed to a high speed, the probability of glass cracking was found by hitting the small piece to the glass plate ten times at the respective impact speeds. The impact speed at which glass cracking occurred with a probability of 50% was found based on a graph obtained by plotting the probability of glass cracking to the impact speeds.

(3) Appearance

The appearance of the glass/resin laminate (A-1) was evaluated by eye sight.

Comparative Example 1

Two glass plates, which are made of soda lime glass having the same material, dimensions and thickness as the ones used in Example 1, a PC sheet (manufactured by Mitsubishi Gas Chemical, Product Name "lupilon") having the same dimensions as the ones and a thickness of 4.0 mm, and two sheets made of an ethylene-vinyl acetate copolymer resin (EVA) and having the same dimensions as the ones and a thickness of 0.25 mm (manufactured by Tosoh Corporation, Product Name "Melthene G7055", thermoplastic resin for bonding layer formation) were prepared, one of the glass plate, one of the EVA sheets, the PC sheet, the other EVA sheet and the other glass plate are stacked in this order, and the stacked structure was put into a bag made of polyamide. After the inside of the bag was depressurized to 10 mmHg, the opening of the bag was thermally welded to obtain a vacuum packaging. The vacuum-packaged bag was heated at 100° C. for one hour by an oven. With respect to the laminate obtained by being cooled to a normal temperature, the measurement of the compressive stresses on the surface, and the evaluation of the impact resistance and the appearance were carried out in the same manner as Example. The results are shown in Table 1.

Comparative Example 2

By carrying out injection compression molding in the same manner as Example 1 except that each laminate having a two layered structure with a glass plate and a bonding layer laminated therein (C-1) was used in place of the laminates with a glass plate, a bonding layer and a PC film laminated in this order therein (B-1), a glass/resin laminate (D-1), which has a glass plate, a bonding layer, a PC layer, a bonding layer and a glass plate laminated in this order therein, was obtained. It should be noted that the two laminates (C-1) were placed in the cavity of the injection molding machine such that both bonding layers were confronted each other, and PC was injected into between the confronted bonding layers. It was observed that the glass/resin laminate (D-1) thus obtained had a poor appearance caused by a resin flow on a bonding layer. Neither compressive stresses nor impact resistance were measured with respect to Comparative Example 2 since such poor appearance was observed.

TABLE 1

|  |  | Example | Comparative Example 1 |
|---|---|---|---|
| Compressive stress (MPa) | Average compressive stress | 12.4 | 1.8 |
|  | Minimum compressive stress | 5.0 | −15.5 |
| Impact resistance (impact speed at which a crack occurred with a probability of 50%) (km/h) |  | 65 | 42 |
| Appearance |  | Excellent | Excellent |

As shown in Table 1, the glass/resin laminate (A-1) obtained in Example had compressive stresses of at least 3 MPa on the entire surface of each glass plate and was excellent in impact resistance. Further, no resin flow was observed on the bonding layers, and the appearance was excellent. In contrast, the laminate of Comparative Example 1 had low compressive stresses and was poor in impact resistance. The glass/resin laminate (D-1) in Comparative Example 2 was observed to have poor appearance caused by resin flow in a bonding layer.

INDUSTRIAL APPLICABILITY

In accordance with the present invention, it is possible to produce a glass/resin laminate (A) which has an impact resistance such that the laminate is hardly to be cracked even if a flying object, such as a stone, is hit against the laminate, and which has an excellent appearance having no visible resin flow. The glass/resin laminate (A) is suited to window glass for a vehicle, such as an automobile, and window glass for a building material, which is mounted to a building, such as a house or an office building. The glass/resin laminate (A) is appropriate to be applied to window glass for a vehicle, such as an automobile in terms of being lightweight.

This application is a continuation of PCT Application No. PCT/JP2014/082586, filed on Dec. 9, 2014, which is based upon and claims the benefit of priority from Japanese Patent Application No. 2013-259588 filed on Dec. 16, 2013. The contents of those applications are incorporated herein by reference in their entireties.

REFERENCE SYMBOLS

10: Glass/resin laminate (A)
11: PC layer
12: Bonding layer
13: Glass plate
20: Laminate (B)
21: PC film
30: Injection molding machine
31: Cavity
32: Molding unit
33: Fixed die
33a: Cavity forming surface
33b: Gate
34: Movable die
34a: Cavity forming surface

What is claimed is:

1. A glass/resin laminate, comprising:
glass plates laminated on both sides of a polycarbonate layer through bonding layers made of a thermoplastic resin;
wherein:
each of the glass plates has a thickness of from 0.3 to 1 mm;
each of the glass plates has compressive stresses of at least 3 MPa on an entire surface thereof; and
the thermoplastic resin has a glass transition temperature of from 160 to 250° C.

2. A process for producing a glass/resin laminate (A) according claim 1 comprising:
disposing a bonding layer on one side of a polycarbonate film having a thickness of from 0.05 to 0.2 mm, the bonding layer being made of a thermoplastic resin, and stacking a glass plate on the bonding layer to prepare a laminate (B) with the polycarbonate film and the glass plate being laminated through the bonding layer; or disposing a bonding layer on one side of a glass plate, the bonding layer being made of a thermoplastic resin, and stacking a polycarbonate film having a thickness of from 0.05 to 0.2 mm on the bonding layer to prepare a laminate (B) with the glass plate and the polycarbonate film being laminated through the bonding layer; and
preparing another similar laminate (B), placing both laminates (B) in a mold such that both polycarbonate films are confronted each other, and forming a polycarbonate layer between the confronted polycarbonate films.

3. The process for producing a glass/resin laminate (A) according to claim 2, wherein the thermoplastic resin is at least one kind selected from the group consisting of a thermoplastic polyurethane elastomer, an ethylene-vinyl acetate copolymer resin and polyvinyl butyral.

4. The glass/resin laminate according to claim 1, wherein the polycarbonate layer comprises polycarbonate films provided on both sides of an injection-molded polycarbonate layer.

5. The glass/resin laminate according to claim 1, wherein the polycarbonate layer has a thickness of from 2 to 6 mm.

6. The glass/resin laminate according to claim 1, wherein the thermoplastic resin is at least one kind selected from the group consisting of a thermoplastic polyurethane elastomer, an ethylene-vinyl acetate copolymer resin, and polyvinyl butyral.

7. The glass/resin laminate according to claim 1, wherein each glass plate has a thickness of from 0.4 to 0.7 mm.

8. The glass/resin laminate according to claim 1, wherein the thermoplastic resin has a glass transition temperature of from 180 to 200° C.

9. The glass/resin laminate according to claim 1, wherein the thermoplastic resin is a thermoplastic polyurethane elastomer.

10. The glass/resin laminate according to claim 1, wherein the bonding layer has a thickness of from 0.01 to 0.1 mm.

11. The glass/resin laminate according to claim 1, wherein the polycarbonate layer has a thickness of from 3 to 5 mm.

12. A laminate, comprising:
a polycarbonate film laminated on one side of a glass plate through a bonding layer;
wherein:
the polycarbonate film has a thickness of from 0.05 to 0.2 mm;
the glass plate has a thickness of from 0.3 to 1 mm;
the bonding layer is made of a thermoplastic resin; and
the thermoplastic resin has a glass transition temperature of from 160 to 250° C.

13. The laminate according to claim 12, wherein the thermoplastic resin is at least one kind selected from the group consisting of a thermoplastic polyurethane elastomer, an ethylene-vinyl acetate copolymer resin and polyvinyl butyral.

* * * * *